United States Patent
Pozzi et al.

(10) Patent No.: US 11,066,170 B2
(45) Date of Patent: Jul. 20, 2021

(54) AIRCRAFT PASSENGER SEATING UNIT AND PASSENGER SEATING ARRANGEMENT

(71) Applicant: B/E Aerospace, Inc., Winston-Salem, NC (US)

(72) Inventors: Alexander N. Pozzi, Winston-Salem, NC (US); Tom Plant, Winston-Salem, NC (US); Michael J. Schmid, Winston-Salem, NC (US); Daniel Udriste, Winston-Salem, NC (US); Ryan Suhre, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 9 days.

(21) Appl. No.: 16/378,707

(22) Filed: Apr. 9, 2019

(65) Prior Publication Data

US 2019/0308731 A1 Oct. 10, 2019

Related U.S. Application Data

(63) Continuation of application No. 15/946,900, filed on Apr. 6, 2018.

(51) Int. Cl.
*B64D 11/06* (2006.01)
*B64D 11/00* (2006.01)

(52) U.S. Cl.
CPC .... *B64D 11/0601* (2014.12); *B64D 11/00151* (2014.12); *B64D 11/0602* (2014.12); *B64D 11/0606* (2014.12); *B64D 11/0638* (2014.12); *B64D 11/0643* (2014.12)

(58) Field of Classification Search
CPC . B64D 11/06; B64D 11/0601; B64D 11/0606; B64D 11/0638; B64D 11/064; B64D 11/0643; B64D 11/0646; B64D 11/00151
See application file for complete search history.

(56) References Cited

U.S. PATENT DOCUMENTS

| | | | |
|---|---|---|---|
| 4,936,620 A * | 6/1990 | Francois | B64D 11/00 105/345 |
| 6,059,364 A * | 5/2000 | Dryburgh | A47C 1/0352 297/354.13 |
| 7,156,346 B2 | 1/2007 | Mercier | |
| 7,252,268 B2 | 8/2007 | Saint-Jalmes et al. | |
| 7,578,470 B2 | 8/2009 | Plant | |
| 8,196,864 B2 | 6/2012 | Ruiter et al. | |
| 8,382,036 B2 | 2/2013 | Ruiter et al. | |
| 8,807,481 B2 | 8/2014 | Plant | |
| 8,944,379 B2 | 2/2015 | Orson | |
| 8,998,139 B2 | 4/2015 | Dryburgh et al. | |
| 9,446,848 B2 * | 9/2016 | Jerome | B60N 2/34 |
| 9,550,573 B2 | 1/2017 | Ersan | |

(Continued)

*Primary Examiner* — Richard R. Green
*Assistant Examiner* — Michael A. Fabula
(74) *Attorney, Agent, or Firm* — Suiter Swantz pc llo

(57) ABSTRACT

A layout of passenger seats in an aircraft cabin including a first passenger seat positioned in a forward-facing direction and parallel to an aircraft longitudinal axis, and a second passenger seat positioned to one side of the first passenger seat, in a forward-facing direction, and at an angle with respect to the aircraft longitudinal axis, wherein the second passenger seat is angled toward the first passenger seat.

12 Claims, 8 Drawing Sheets

(56) References Cited

U.S. PATENT DOCUMENTS

| | | | | |
|---|---|---|---|---|
| 9,828,099 B2* | 11/2017 | Henshaw | ............ | B64D 11/0606 |
| 2002/0070314 A1* | 6/2002 | Schmidt-Schaeffer | ............ | |
| | | | | B64D 11/064 |
| | | | | 244/118.6 |
| 2004/0195451 A1* | 10/2004 | Bentley | ............ | B64D 11/06 |
| | | | | 244/118.6 |
| 2005/0151405 A1* | 7/2005 | Dowty | ............ | B60N 2/62 |
| | | | | 297/317 |
| 2005/0194827 A1* | 9/2005 | Dowty | ............ | B60N 2/643 |
| | | | | 297/411.3 |
| 2006/0086864 A1* | 4/2006 | Beroth | ............ | B64D 11/06 |
| | | | | 244/122 R |
| 2007/0034742 A1* | 2/2007 | Jaeger | ............ | B64D 11/0601 |
| | | | | 244/118.6 |
| 2009/0146004 A1 | 6/2009 | Plant | | |
| 2010/0065683 A1* | 3/2010 | Darbyshire | ............ | B64D 11/06 |
| | | | | 244/118.6 |
| 2010/0065684 A1 | 3/2010 | Ruiter | | |
| 2012/0112500 A1* | 5/2012 | Rundle | ............ | B64D 11/00 |
| | | | | 297/147 |
| 2012/0146372 A1* | 6/2012 | Ferry | ............ | B64D 11/06 |
| | | | | 297/232 |
| 2012/0223186 A1* | 9/2012 | Henshaw | ............ | B64D 11/06 |
| | | | | 244/118.6 |
| 2012/0292957 A1* | 11/2012 | Vergnaud | ............ | B64D 11/06 |
| | | | | 297/188.08 |
| 2013/0068887 A1* | 3/2013 | Ko | ............ | B64D 11/06 |
| | | | | 244/118.6 |
| 2014/0035330 A1* | 2/2014 | Henshaw | ............ | B60N 3/002 |
| | | | | 297/174 R |
| 2014/0283296 A1* | 9/2014 | Jerome | ............ | B60N 2/34 |
| | | | | 5/12.1 |
| 2014/0306500 A1* | 10/2014 | Dryburgh | ............ | B64D 11/0604 |
| | | | | 297/232 |
| 2015/0001341 A1* | 1/2015 | Ersan | ............ | B64D 11/0601 |
| | | | | 244/118.6 |
| 2015/0367942 A1* | 12/2015 | Parry | ............ | B64D 11/06 |
| | | | | 244/118.5 |
| 2017/0015420 A1* | 1/2017 | Henshaw | ............ | B64D 11/0606 |
| 2017/0088267 A1* | 3/2017 | Dowty | ............ | B64D 11/06 |
| 2017/0129611 A1* | 5/2017 | Morgan | ............ | B64D 11/0606 |
| 2017/0233057 A1* | 8/2017 | Charles | ............ | B64D 11/0601 |
| | | | | 244/122 R |
| 2017/0259921 A1* | 9/2017 | Valdes De La Garza | ............ | |
| | | | | B64D 11/0638 |
| 2018/0022458 A1* | 1/2018 | Weifenbach | ............ | B64D 11/0601 |
| 2018/0029712 A1* | 2/2018 | Sieben | ............ | B60N 2/01 |
| 2018/0029713 A1* | 2/2018 | Weifenbach | ............ | B64D 11/0601 |
| 2019/0077512 A1* | 3/2019 | Bentley | ............ | B64D 11/0601 |
| 2019/0092475 A1* | 3/2019 | Carlioz | ............ | B64D 11/0601 |
| 2019/0241269 A1* | 8/2019 | Martin | ............ | B64D 11/0601 |
| 2019/0276151 A1* | 9/2019 | Dryburgh | ............ | B64D 11/0644 |

* cited by examiner

AIRCRAFT PASSENGER SEATING UNIT AND PASSENGER SEATING ARRANGEMENT

BACKGROUND

The inventive concepts disclosed herein are generally directed to aircraft passenger seats and passenger seating arrangements, and more particularly, to an aircraft passenger seating unit and seating arrangements including the same, each seating unit configured as a window-facing seating unit or as an aisle-facing seating unit generally including first and second laterally adjacent seats oriented at an angle to a longitudinal aircraft axis to maximum seating density without sacrificing comfort and privacy, among other features and advantages.

In air travel and the like, passenger cabins are commonly divided into economy and premium seating classes. Economy seating classes typically include multiple rows of laterally adjacent passenger seats. Seats can be grouped into units of two or three seats depending on the width of the aircraft, and laterally adjacent rows can be separated by a center aisle that runs parallel with the longitudinal aircraft axis. Economy class seats are forward facing, parallel to the longitudinal aircraft axis, and can be equipped with shallow seat back recline and seat back or armrest mounted tray tables for use during flight. Comfort, seat pitch and amenities are commensurate with economy fares.

Premium seating classes such as business class, first class and super first class are equipped with amenities commensurate with premium fares. One such amenity is a larger, more comfortable seat configured with greater seat recline. Seat recline can include changes in the seat back and seat bottom angles between the upright and reclined sitting positions, and in super premium classes, seats capable of reclining to form a flat bed. Another amenity in premium seating classes is privacy, which can be enhanced by increasing seat width and spacing between laterally adjacent seats.

There is a balance between seat comfort and seating density when configuring both economy and premium seating classes. Conventional economy class seating configurations sacrifice comfort to increase seating density, while premium class seating configurations sacrifice seating density to increase comfort. As such, it would be desirable to provide a passenger seat configuration and seating arrangement that maximizes both seating density and comfort.

SUMMARY

In one aspect, the inventive concepts disclosed herein are directed to a layout of passenger seats in an aircraft cabin including a first passenger seat positioned in a forward-facing direction and parallel to an aircraft longitudinal axis, and a second passenger seat positioned to one side of the first passenger seat, in a forward-facing direction, and at an angle with respect to the aircraft longitudinal axis, wherein the second passenger seat is angled toward the first passenger seat.

In some embodiments, the layout may further include a plurality of like first passenger seats positioned in a first column of first passenger seats in longitudinal alignment, and a plurality of like second passenger seats positioned in a second column of second passenger seats in longitudinal alignment, wherein the first and second columns are parallel.

In some embodiments, the layout may further include a privacy shell positioned behind each of the first and second passenger seats.

In some embodiments, the layout may further include a footwell formed in a backside of each privacy shell.

In some embodiments, a video monitor and a tray table may be affixed to a backside of each privacy shell, the video monitor facing rearward and the tray table deployable in a rearward direction.

In some embodiments, each privacy shell may include a first portion positioned behind the respective passenger seat and a second portion extending along one side of the respective passenger seat.

In some embodiments, the first and second portions may be continuous.

In some embodiments, the privacy divider may further include a privacy divider extension configured to extend in a forward from within the second portion.

In some embodiments, the first and second passenger seats may be separated by a longitudinal aisle.

In some embodiments, the first and second passenger seats may be staggered along the aircraft longitudinal axis.

Another inventive aspect of the present disclosure is directed to a layout of passenger seats in an aircraft cabin including a plurality of first passenger seats positioned in a first longitudinal column, each of the plurality of first passenger seats oriented in a forward-facing direction and parallel to an aircraft longitudinal axis, and a plurality of second passenger seats positioned in a second longitudinal column to one side of the first longitudinal column, each of the plurality of second passenger seats oriented in a forward-facing direction and at an angle with respect to the aircraft longitudinal axis angled toward the first longitudinal column.

In some embodiments, the plurality of first passenger seats in the first longitudinal column may be longitudinally-aligned and spaced apart, and wherein the plurality of second passenger seats in the second longitudinal column may be longitudinally-aligned and spaced apart.

In some embodiments, the first longitudinal column and the second longitudinal column may be spaced apart by a longitudinal aisle parallel to the aircraft longitudinal axis.

In some embodiments, the layout may further include a privacy shell positioned behind each one of the pluralities of first and second passenger seats.

In some embodiments, the layout may further include a footwell formed in a backside of each privacy shell.

In some embodiments, the layout may further include a video monitor and a tray table affixed to a backside of each privacy shell, the video monitor facing rearward and the tray table deployable in a rearward direction.

In some embodiments, each privacy shell may include a first portion positioned behind the respective passenger seat and a second portion extending along one side of the respective passenger seat.

In some embodiments, the first and second portions may be continuous.

In some embodiments, the privacy divider may further include a privacy divider extension configured to extend in a forward from within the second portion.

In some embodiments, the first and second passenger seats may be staggered along the aircraft longitudinal axis.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Referring to the figures, the inventive concepts disclosed herein are directed to aircraft seating units configured as window-facing or aisle-facing units. Each unit includes two laterally adjacent and parallel seats oriented at an angle to the longitudinal aircraft axis. The seats are positioned such that a forwardmost extent of each seat bottom, when the seats are in the upright sitting position, resides along a common plane perpendicular to the longitudinal aircraft axis. In this configuration, the seat backs therefore also align along a common plane perpendicular to the longitudinal aircraft axis. The parallel seat alignment and angling of the seats of each seating unit relative to the longitudinal aircraft axis enhances privacy while maximizing seating density.

In addition, as an alternative to lie flat seats, each seat of the seating unit is configured to recline to achieve a deep lounge mode sitting position. As used herein, the term "deep lounge mode sitting position" refers seat recline greater than standard recline of an economy class seat, but short of full recline of a lie flat seat. To accommodate a deep lounge mode sitting position, each seating unit includes footwells for accommodating the lower legs of an aft-seated passenger in a like seating unit when the aft-positioned seats are reclined to the deep lounge mode. This allows a passenger to lounge with straight legs positioned inside the footwell, thus providing a good alternative to a lie flat seat, as well as decreases the seat pitch to maximize seating density.

Figure 1:
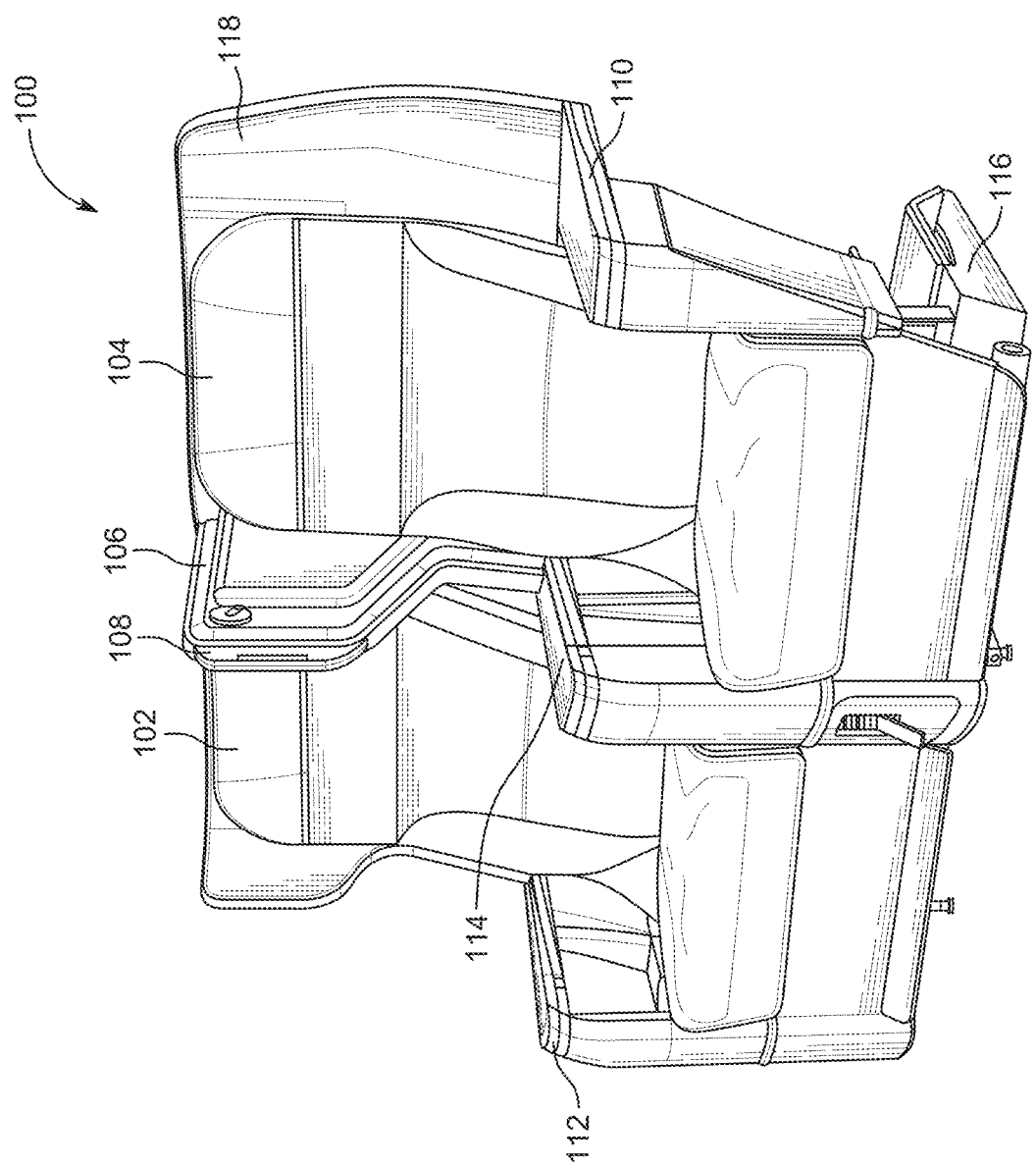
FIG. 1 is a front perspective view of an aircraft passenger seating unit according to an embodiment of the present disclosure.

Referring to FIG. 1, an aircraft passenger seating unit according to an exemplary embodiment is shown generally at reference numeral 100. The aircraft passenger seating unit 100, also referred to herein as the "seating unit 100" or "aircraft seating unit 100" generally includes a first passenger seat 102 positioned laterally adjacent a second passenger seat 104. As discussed in detail below, the longitudinal axis of the first passenger seat 102 is parallel to the longitudinal axis of the second passenger seat 104, and at an angle to the longitudinal aircraft axis. Thus, the longitudinal axis of each of the first and second passenger seats 102, 104 is not parallel to the longitudinal aircraft axis, but is at a predetermined angle thereto.

A fixed partition 118 is positioned rearward of the first and second passenger seats 102, 104 and runs continuous along the full length of the aircraft passenger seating unit 100. A middle portion 106 of the fixed partition 118 extends forward between the first and second passenger seats 102, 104 about upper seat back portions thereof. A deployable partition 108 can deploy forward from the middle portion 106 as needed to further enhance privacy between the first and second passenger seats 102, 104.

A left armrest 110 is positioned at the left lateral extent of the aircraft passenger seating unit 100, a right armrest 112 is positioned at the right lateral extent of the aircraft passenger seating unit 100, and a shared armrest 114 is positioned between the first and second passenger seats 102, 104. The shared armrest 114 can run continuously from a height above the seat bottoms to a depth below the seat bottoms to further enhance privacy and separate the seat spaces. The fixed partition 118 can extend continuously along the entire length of the aircraft passenger seating unit 100 and can extend upwardly from a rearwardmost extent of the left, right and shared armrests to a height above the seat backs of the first and second passenger seats 102, 104. The first and second passenger seats 102, 104 are positioned above a platform 116, which can cover the frame members adapted to secure the seating unit to the aircraft deck.

Figure 2:
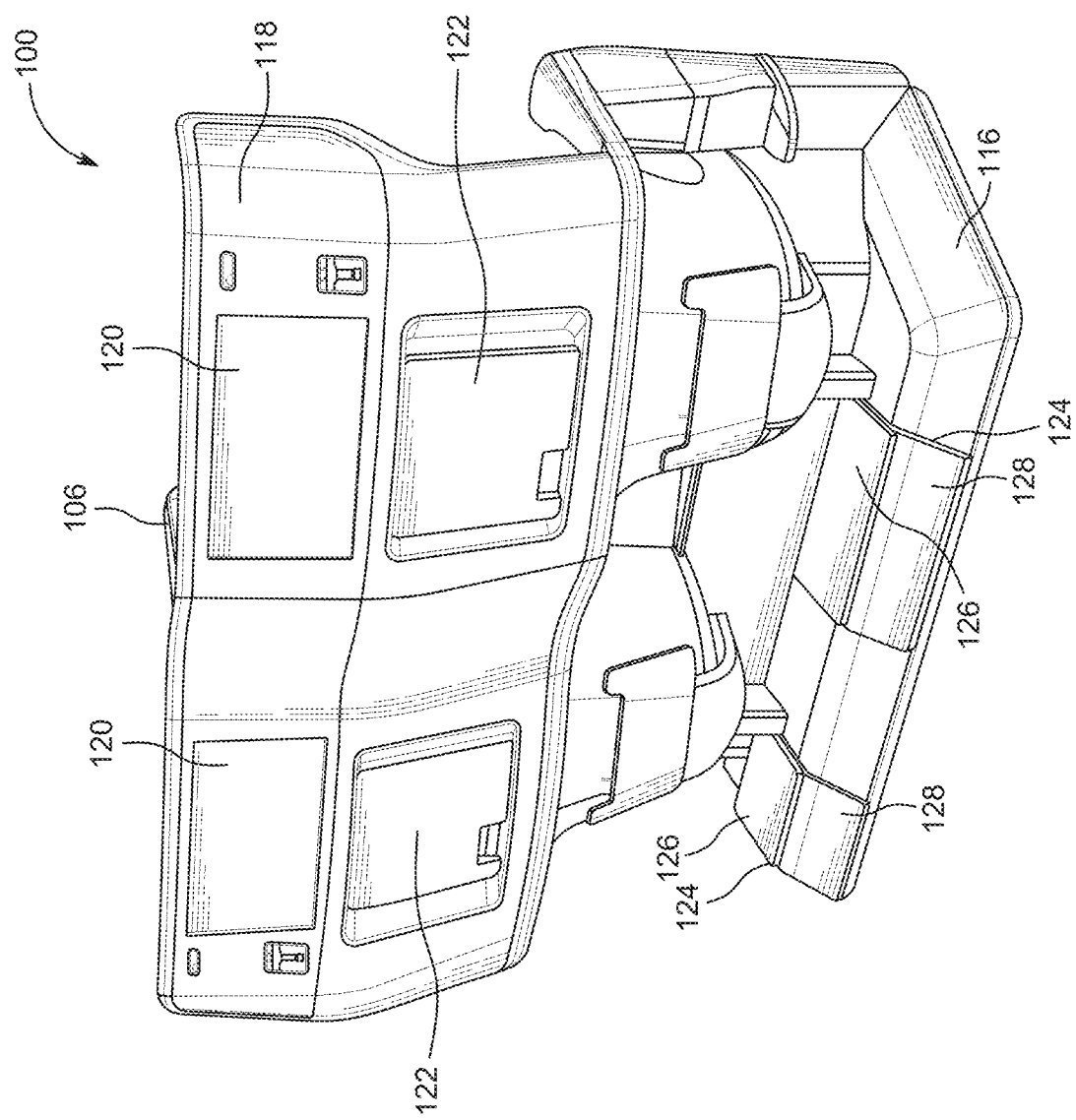
FIG. 2 is a rear perspective view of the aircraft passenger seating unit of FIG. 1.

Referring to FIG. 2, the fixed partition 118 is elevated above the platform 116 and serves as the mounting location for video monitors and tray tables for use by passengers seated in an aft-positioned like seating unit. In an exemplary embodiment, behind the first passenger seat is a first video monitor 120 and a first deployable seatback tray table 122 for use by an aft-seated passenger in a like first passenger seat, and behind the second passenger seat is a second video monitor 120 and a second deployable seatback tray table 122 for use by an aft-seated passenger in a like second passenger seat. As shown, each video monitor 120 is positioned directly above the respective tray table 122 such that each of the video monitors and tray tables are positioned at the optimal height for their interned use.

The platform 116 extends substantially the length of the aircraft seating unit 100. A first footwell is defined in the space above the platform 116 between the first and second passenger seats for use by a passenger seated in a like first passenger seat of a like aircraft passenger seating unit in a longitudinally aligned aft-positioned row. A second footwell is defined in the space above the platform 116 to the side of the second passenger seat apart from the first passenger seat for use by a passenger seated in a like second passenger seat of the like aircraft passenger seating unit in the aft-positioned row. The first and second footwells accommodate the feet and lower legs of the aft-seated passengers when in the upright, deep lounge, and intermediate sitting positions.

First and second ottomans 124 are positioned in the respective first and second footwells. Each ottoman includes a generally horizontal portion 126 and an interconnected angled portion 128. The horizontal and angled portions 126, 128 can be oriented to conform to the underlying shape of the platform 116, and as such, the shape may vary. The horizontal and angled portions provide alternative resting locations for the feet and lower legs depending on passenger preference and sitting position. Each of the first and second ottomans 124 may be deployable from a first position adjacent the platform 116 to a second position elevated above the platform 116. For example, the ottomans 124 may be in the lowered position when the aft-seated passengers are in the upright sitting position, and may be raised to the elevated position when the aft-seated passengers are in the deep lounge recline mode.

Figure 3:
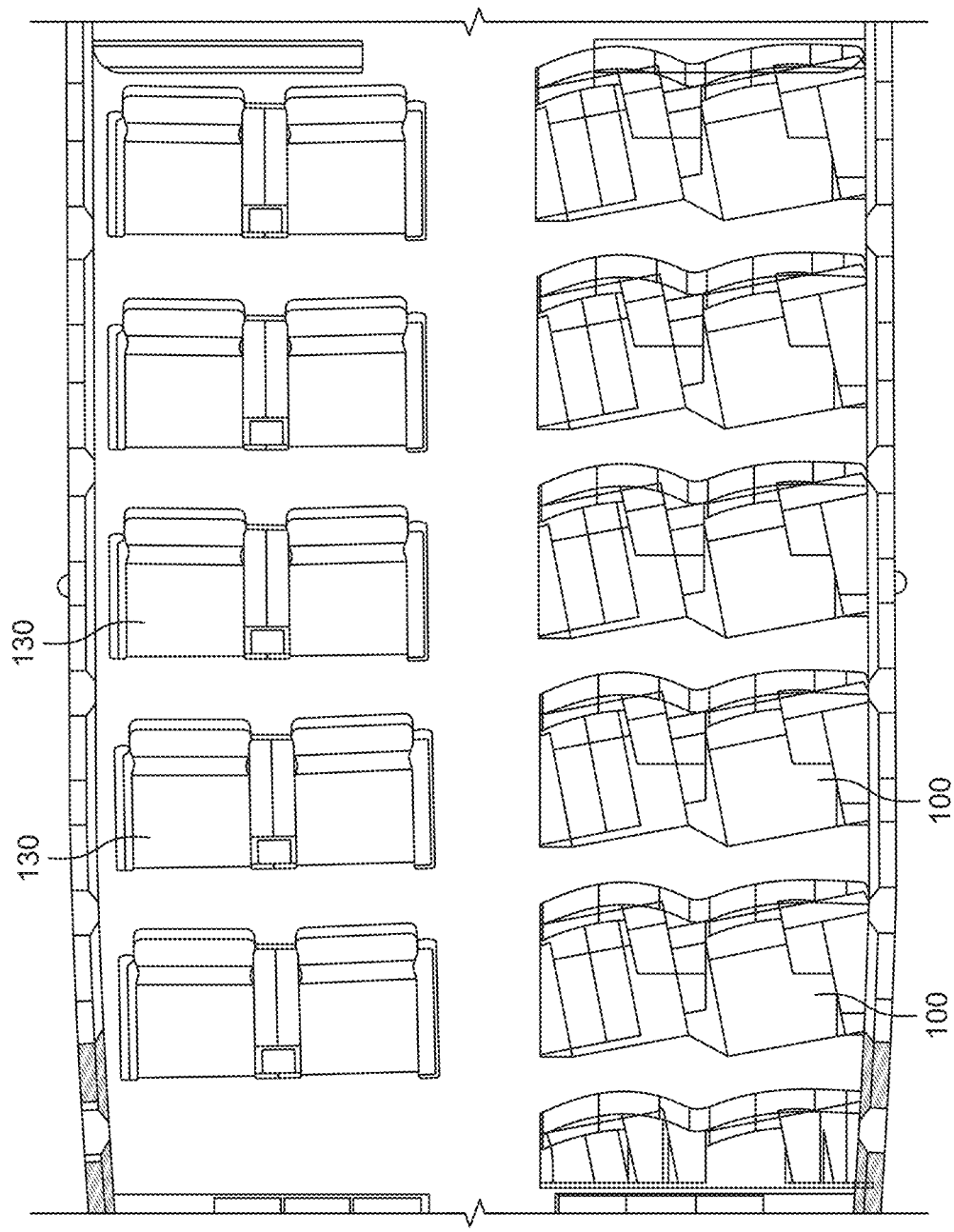
FIG. 3 is a plan view of an exemplary aircraft passenger seating arrangement illustrating window-facing configurations of aircraft passenger seating units.
Figure 4:
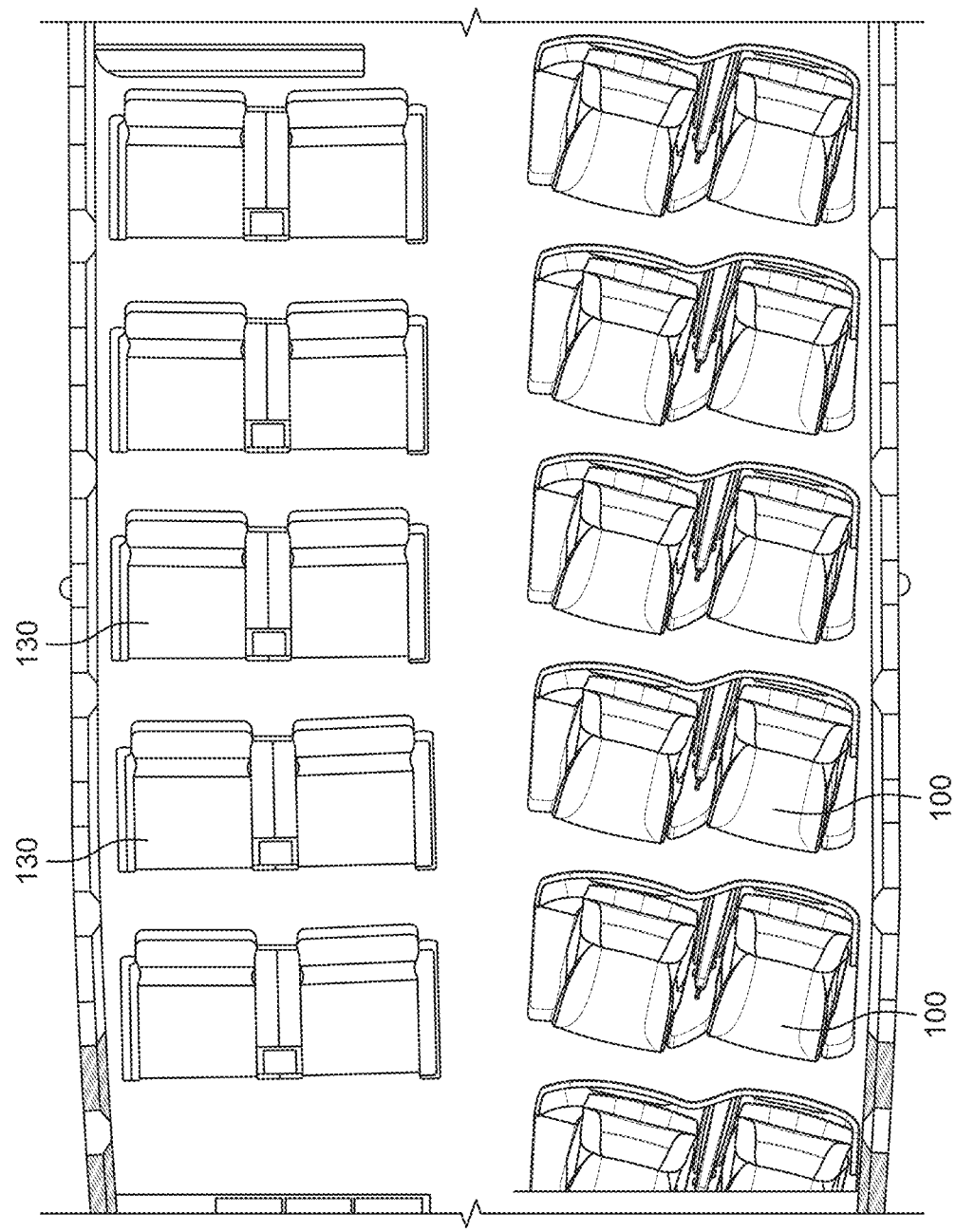
FIG. 4 is a plan view of an exemplary aircraft passenger seating arrangement illustrating aisle-facing configurations of aircraft passenger seating units.

Referring to FIGS. 3 and 4, exemplary passenger seating arrangements including a plurality of aircraft seating units 100 are shown. Each exemplary passenger seating arrangement generally includes spaced columns of seating units separated by a longitudinal aisle that runs parallel to the longitudinal aircraft axis. As shown in FIG. 3, for comparative purposes, the first column includes longitudinally aligned rows of like aircraft passenger seating units 100 according to the inventive concepts disclosed herein, a second column of conventional forward-facing seating units 130, and a center aisle. The aircraft seating units 100 are configured as longitudinally-aligned window-facing seating units, meaning that each of the first and second passenger seats of each seating unit faces toward the windows adjacent the unit and not the aisle. The aircraft seating units 100 are longitudinally aligned.

Referring to FIG. 4, the seating arrangement includes a column of rows of conventional seating units 130 and a column of rows of aisle-facing aircraft seating units 100, such that the conventional seats are forward facing and the seats of the aircraft seating units 100 face in a direction of the center aisle.

While FIGS. 3 and 4 show passenger seating configurations including both aircraft seating units according to the present invention and conventional forward-facing seats to compare seating density achievable with each type of seating unit, it is envisioned that both seat columns, and any additional seat columns in a predetermined zone, are preferably configured as all window-facing aircraft passenger seating units 100, all aisle-facing aircraft passenger seating units 100, or various combinations of window-facing aircraft passenger seating units and aisle-facing aircraft passenger seating units. Regardless of the facing orientation of the seating units within each column, all rows within a single column in each seating section preferably have the same facing orientation to make use of the seat and footwell alignment to achieve the deep lounge mode sitting position and increased seating density.

Figure 5:
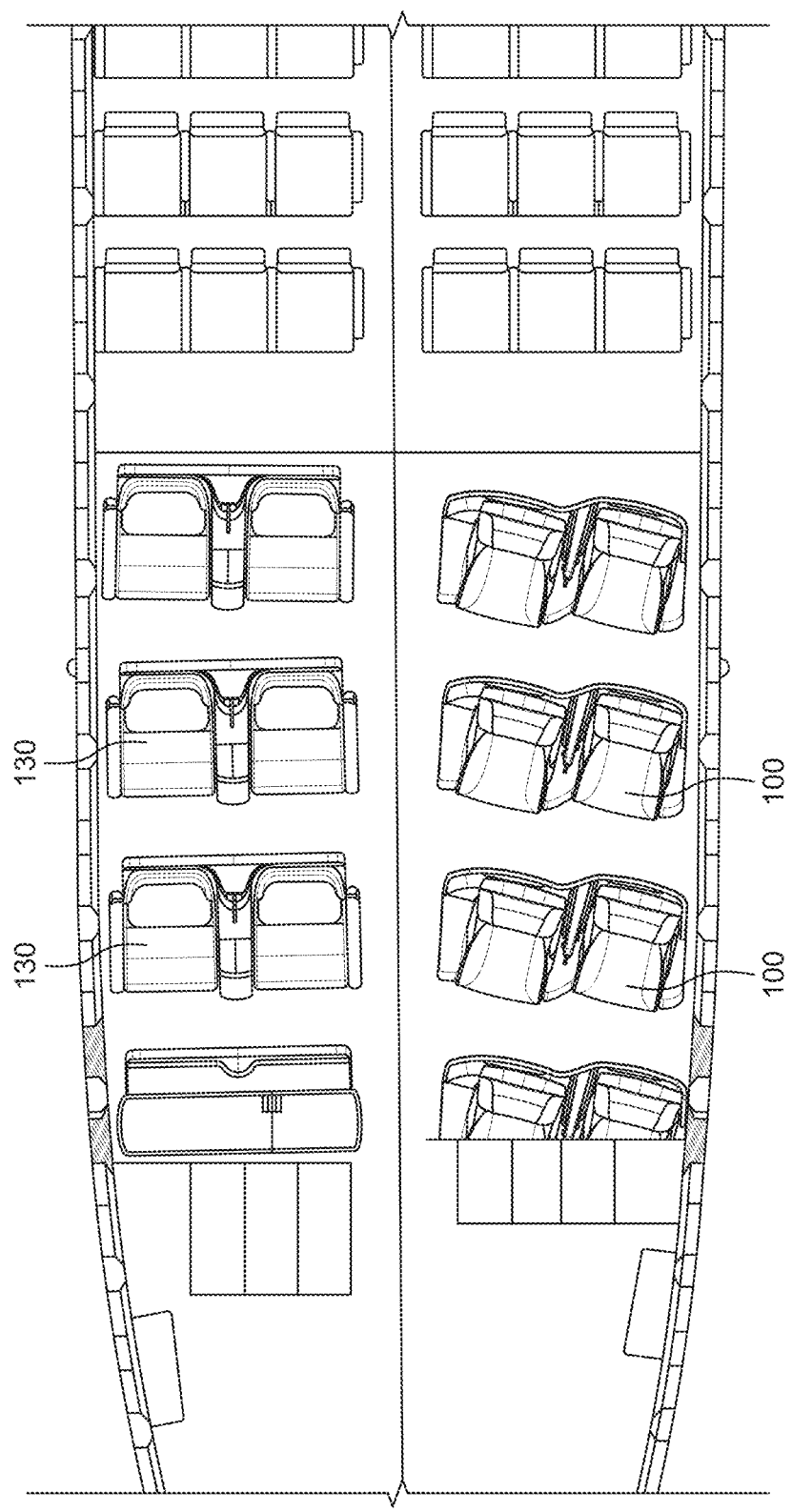
FIG. 5 is a plan view of an aircraft passenger seating arrangement illustrating a seating density comparison at a first predetermined seat pitch.

Referring to FIG. 5, aisle-facing aircraft seating units 100 and conventional forward-facing seating units 130 are shown in the same zone and at the same predetermined seat pitch. Comparing FIGS. 4 and 5, angling the aisle-facing first and second seats of the aircraft seating units 100 allows greater seating density as compared to the conventional seating units 130. As shown in FIG. 5, positioning the aircraft seating units 100 and the conventional seating units 130 at the same first predetermined seat pitch results in an equal number of rows of seating units per predetermined longitudinal length of the aircraft. Referring to FIG. 4, utilizing the aircraft seating units 100 equipped with footwells allows more rows of aircraft seating units 100 per predetermined longitudinal length of the aircraft as compared to conventional forward-facing seats 130. In one particular configuration, the first and second passenger seats of the aisle-facing configuration of the aircraft seating unit 100 can be oriented at an angle to the longitudinal aircraft axis from 12 degrees to 18 degrees, more preferably from 14 degrees to 16 degrees, and most preferably 15 degrees, at a seat pitch from 38" to 47".

Figure 6:
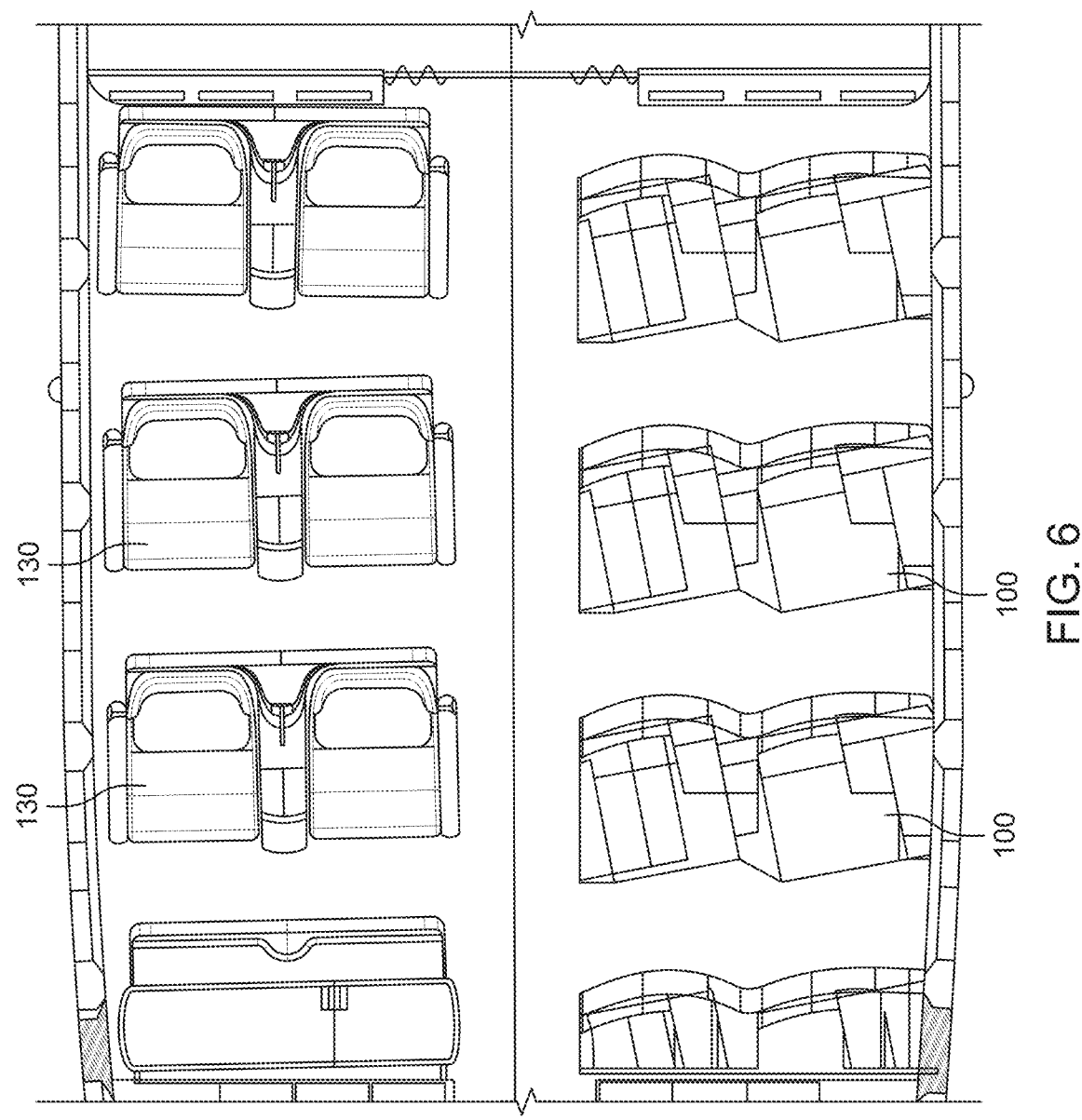
FIG. 6 is a plan view of an aircraft passenger seating arrangement illustrating a seating density comparison at a second predetermined seat pitch.

Referring to FIG. 6, window-facing seating units 100 and conventional forward-facing seating units 130 are shown in the same zone and at the same predetermined seat pitch. Comparing FIGS. 3 and 6, angling the window-facing first and second seats of the aircraft seating units 100 allows greater seating density as compared to the conventional seating units 130. As shown in FIG. 6, positioning the aircraft seating units 100 and the conventional seating units 100 at the same first predetermined seat pitch results in an equal number of rows of seating units per predetermined longitudinal length of the aircraft. Referring to FIG. 3, utilizing the aircraft seating units 100 equipped with footwells allows more rows of aircraft seating units 100 per predetermined longitudinal length of the aircraft as compared to conventional forward-facing seats 130. In one particular configuration, the first and second passenger seats of the window-facing configuration of the aircraft seating unit 100 can be oriented at an angle to the longitudinal aircraft axis degrees from 8 degrees to 14 degrees, more preferably from 10 degrees to 12 degrees, and most preferably 11 degrees, at a seat pitch from 38" to 47".

Figure 7:
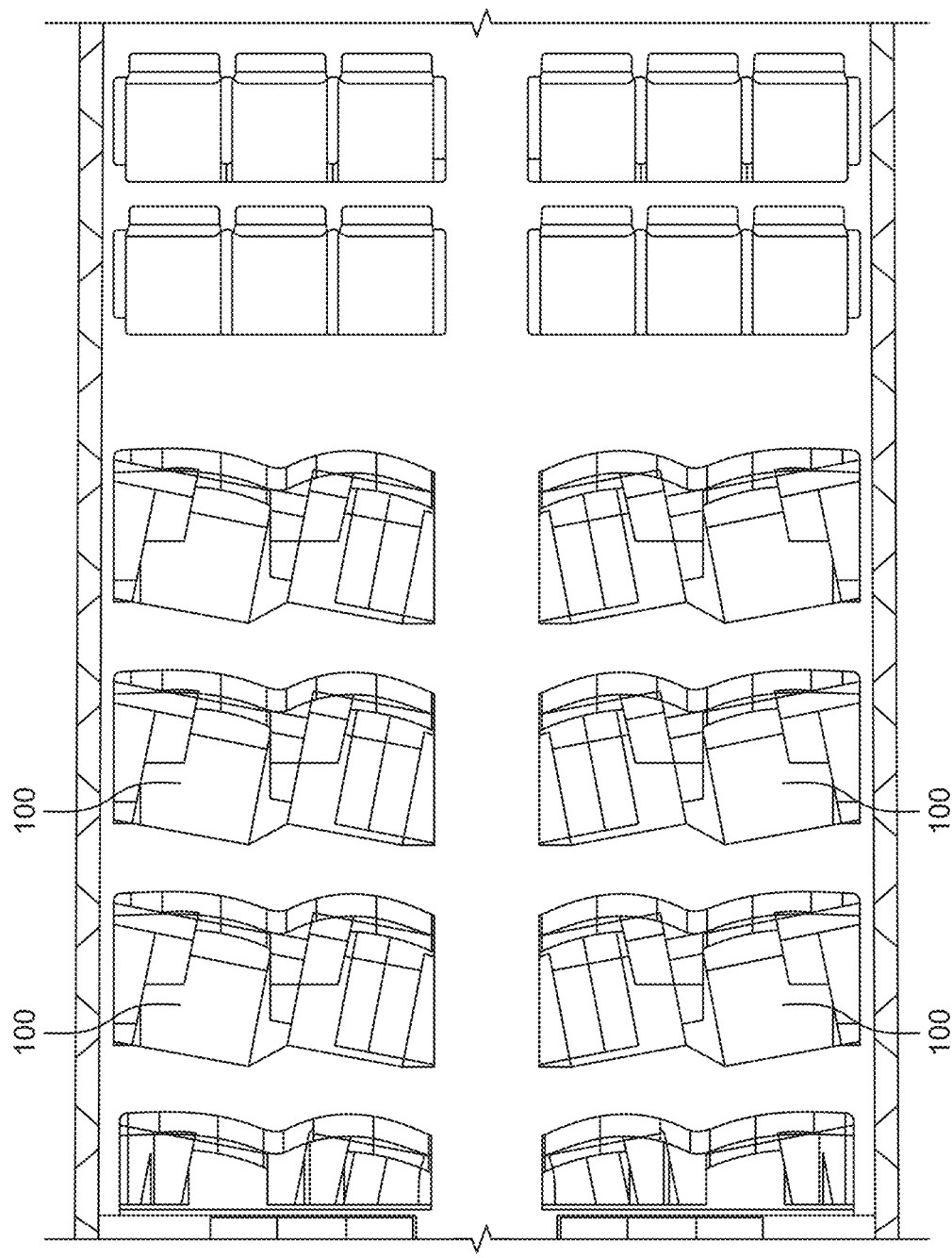
FIG. 7 is a schematic plan view of an aircraft passenger seating arrangement illustrating window-facing configurations of aircraft passenger seating units.

Referring to FIG. 7, an exemplary business class seating configuration includes two columns of aircraft seating units 100 each configured as window-facing aircraft seating units 100. The two columns are separated by a center aisle and the business class configuration is positioned forward of an economy class configuration including seating units of three-laterally adjacent forward-facing seats. To maximize seating density in the business class, the angled seating units 100 are positioned at a predetermined seat pitch of 42", and the angle of each seat relative to the longitudinal aircraft axis is from 8 degrees to 14 degrees, more preferably from 10 degrees to 12 degrees, and most preferably 11 degrees.

Figure 8:
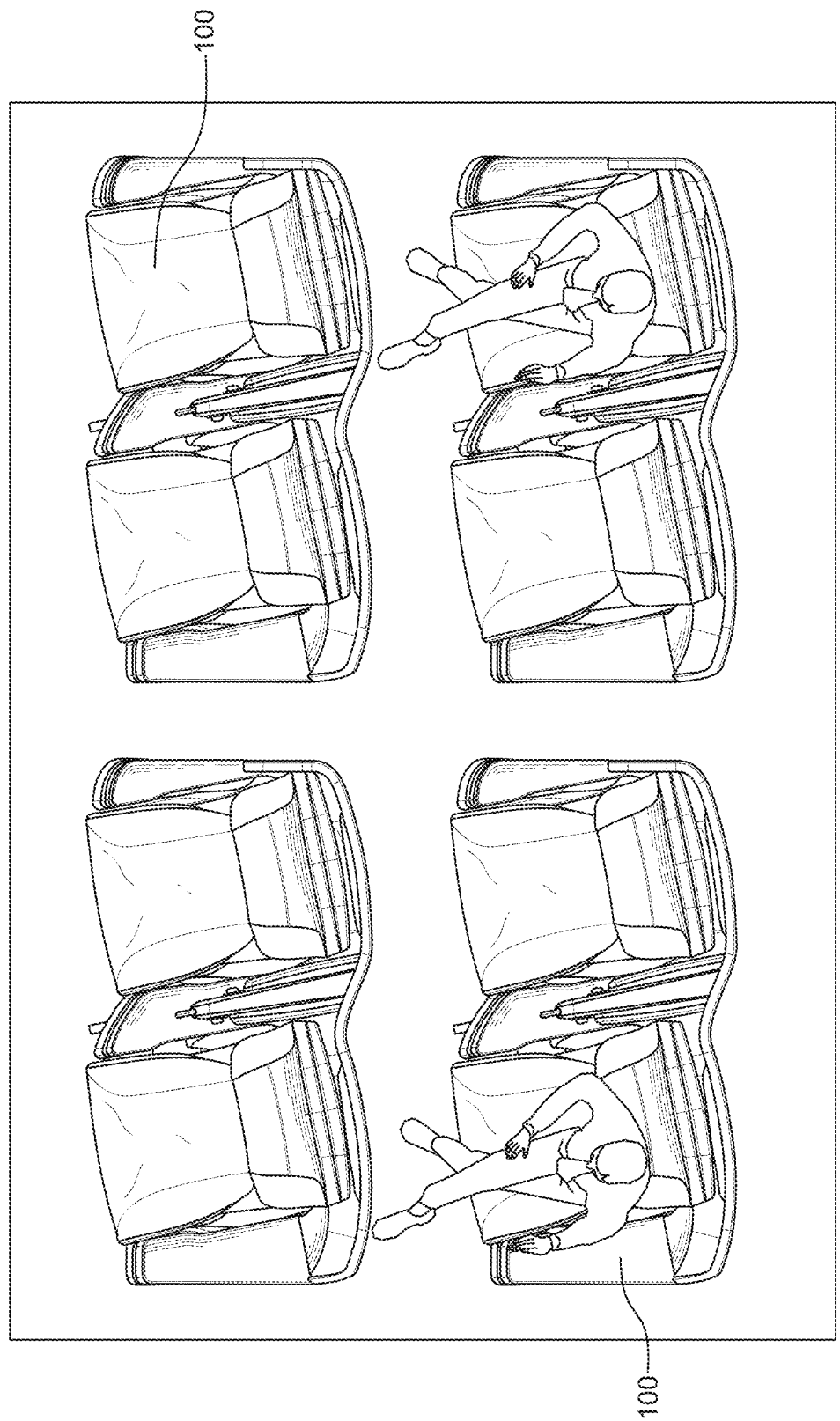
FIG. 8 is a schematic plan view of an aircraft passenger seating arrangement illustrating both window-facing and aisle facing configurations of aircraft passenger seating units.

Referring to FIG. 8, a portion of an exemplary business seating class is configured with window-facing seating units 100 and aisle-facing seating units 100 in separate columns. The two columns are separated by an aisle. One seat in each of the aft-positioned row is shown occupied to illustrating longitudinal unit alignment and footwell use in the forward units to maximize seating density while achieving the deep lounge mode sitting position, and the ability for the passenger to keep his/her legs straight in the deep lounge mode.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A layout of passenger seats in an aircraft cabin, comprising:
   a first passenger seat positioned in a forward-facing direction and parallel to an aircraft longitudinal axis, the first passenger seat positioned directly adjacent and parallel to a longitudinal aisle;
   a second passenger seat positioned to one side of the first passenger seat, in a forward-facing direction, and at an angle with respect to the aircraft longitudinal axis, wherein the second passenger seat is angled toward the first passenger seat, and wherein the second passenger seat is positioned directly adjacent to and angled toward the longitudinal aisle; and a privacy shell positioned behind each of the first and second passenger seats, each privacy shell having a footwell formed in a backside thereof;

wherein the first and second passenger seats are separated by the longitudinal aisle; and wherein the first and second passenger seats are longitudinally staggered along the aircraft longitudinal axis.

2. The layout of claim 1, further comprising a plurality of like first passenger seats positioned in a first column of first passenger seats in longitudinal alignment, and a plurality of like second passenger seats positioned in a second column of second passenger seats in longitudinal alignment, wherein the first and second columns are parallel.

3. The layout of claim 1, further comprising:
a video monitor affixed to a backside of each privacy shell; and
a tray table affixed to the backside of each privacy shell;
wherein the video monitor faces rearward and the tray table deploys rearward.

4. The layout of claim 1, wherein each privacy shell includes a first portion positioned behind the respective passenger seat and a second portion extending along one side of the respective passenger seat.

5. The layout of claim 4, wherein the first and second portions are continuous.

6. The layout of claim 4, further including a privacy divider extension configured to extend in a forward direction from within the second portion.

7. A layout of passenger seats in an aircraft cabin, comprising:
a plurality of first passenger seats positioned in a first longitudinal column, each of the plurality of first passenger seats oriented in a forward-facing direction and parallel to an aircraft longitudinal axis, and each of the first passenger seats positioned directly adjacent and parallel to a longitudinal aisle;

a plurality of second passenger seats positioned in a second longitudinal column to one side of the first longitudinal column, each of the plurality of second passenger seats oriented in a forward-facing direction and at an angle with respect to the aircraft longitudinal axis angled toward the first longitudinal column, and each of the second passenger seats positioned directly adjacent and angled toward the longitudinal aisle; and a privacy shell positioned behind each of the plurality of first and second passenger seats, each privacy shell having a footwell formed in a backside thereof;

wherein the first and second longitudinal columns are separated by the longitudinal aisle; and wherein the first and second passenger seats are longitudinally staggered along the aircraft longitudinal axis.

8. The layout of claim 7, wherein the plurality of first passenger seats in the first longitudinal column are longitudinally-aligned and spaced apart, and wherein the plurality of second passenger seats in the second longitudinal column are longitudinally-aligned and spaced apart.

9. The layout of claim 7, further comprising:
a video monitor affixed to a backside of each privacy shell; and
a tray table affixed to the backside of each privacy shell;
wherein the video monitor faces rearward and the tray table deploys rearward.

10. The layout of claim 7, wherein each privacy shell includes a first portion positioned behind the respective passenger seat and a second portion extending along one side of the respective passenger seat.

11. The layout of claim 10, wherein the first and second portions are continuous.

12. The layout of claim 10, further including a privacy divider extension configured to extend in a forward direction from within the second portion.

* * * * *